BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 7, 1969

858 O.G. 43

T858,012

729,428

SUBSTRATES LAMINATED WITH POLYESTER MELT ADHESIVES DERIVED IN PART FROM A 2,2,4,4-TETRAALKYL-1,3 CYCLOBUTANEDIOL

John R. Caldwell and Russell Gilkey, both of P.O. Box 511, Kingsport, Tenn. 37662

Filed May 15, 1968. Published Jan. 7, 1969

Class 161—214

No Drawing. 29 Pages Specification

A laminated structure comprising at least two substrates bonded together by a melt adhesive comprising a linear condensation polyester derived from (A) at least one difunctional carboxylic acid and (B) at least one difunctional dihydroxy component selected from the group consisting of (1), a 2,2,4,4-tetraalkyl-1,3-cyclobutanediol and (2) a mixture composed of a 2,2,4,4-tetraalkyl-1,3-cyclobutanediol and up to 95 mol percent of said mixture of a different difunctional dihydroxy compound, wherein said 2,2,4,4-tetraalkyl-1,3-cyclobutanediol is selected from the group consisting of its cis and trans isomers and mixtures thereof with said alkyl group containing from one to four carbon atoms. The term polyester includes both polyesters and polycarbonates such as the bisethyl carbonate ester of 50% cis 2,2,4,4-tetramethyl-1,3-cyclobutanediol. The melt adhesive is advantageous for use in laminated structures which must withstand extreme temperature differentials.